United States Patent [19]

Maner et al.

[11] 4,070,352
[45] Jan. 24, 1978

[54] BENZOISOTHIAZOLEAZOBENZMORPHOLINE OF TETRAHYDROQUINONE COMPOUNDS

[75] Inventors: Ronald J. Maner; Max A. Weaver, both of Kingsport, Tenn.

[73] Assignee: Eastman Kodak Company, Rochester, N.Y.

[21] Appl. No.: 626,797

[22] Filed: Oct. 29, 1975

Related U.S. Application Data

[63] Continuation of Ser. No. 418,639, Nov. 23, 1973, abandoned, Continuation-in-part of Ser. No. 252,645, May 12, 1972, abandoned.

[51] Int. Cl.$^2$ .................. C09B 29/36; D06P 1/04; D06P 3/24; D06P 3/26
[52] U.S. Cl. .................. 260/155; 260/152; 260/158
[58] Field of Search .................. 260/155, 158, 152

[56] References Cited
U.S. PATENT DOCUMENTS

| | | | |
|---|---|---|---|
| 2,773,054 | 12/1956 | Straley et al. | 260/155 |
| 2,790,791 | 4/1957 | Towne et al. | 260/158 |
| 2,839,523 | 6/1956 | Towne et al. | 260/155 |
| 3,143,540 | 8/1964 | Meen et al. | 260/155 |
| 3,272,791 | 9/1966 | Moore et al. | 260/155 |
| 3,816,390 | 6/1974 | Weaver | 260/158 |

*Primary Examiner*—Floyd D. Higel
*Attorney, Agent, or Firm*—Donald W. Spurrell; Daniel B. Reece, III

[57] ABSTRACT

Azo compounds, having the formula

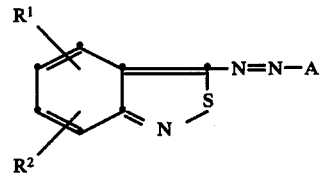

in which $R^1$ and $R^2$ are hydrogen, alkyl, alkoxy or halogen and A is a 2-position substituted tetrahydroquinoline type coupler which may be further substituted, or a benzomorpholine type coupler for disperse azo dyes, produce bright, level reddish-blue to blue shades on synthetic polyamide fiber and exhibit good to excellent fastness to light, sublimation, ozone and gas.

7 Claims, No Drawings

BENZOISOTHIAZOLEAZOBENZMORPHOLINE OF TETRAHYDROQUINONE COMPOUNDS

This is a continuation of application Ser. No. 418,639 filed Nov. 23, 1973, now abandoned, which is a continuation-in-part of Ser. No. 252,645 filed May 12, 1972, abandoned.

This invention concerns novel azo compounds consisting of certain benzisothiazole diazo components and tetrahydroquinoline and benzomorpholine coupling components. This invention also concerns synthetic polyamide fibers dyed with the novel azo compounds.

Our novel azo compounds have the general formula

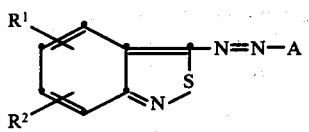

(I)

in which $R^1$ and $R^2$ each is hydrogen, lower alkyl, lower alkoxy, chlorine and bromine and A is a 1,2,3,4-tetrahydroquinoline or benzomorpholine disperse azo dye coupling component. These azo compounds are particularly useful for dyeing synthetic polyamide fibers reddish-blue to blue shades. In addition to the commercially-desirable blue shades produced by our compounds on polyamide fibers, they exhibit good to excellent fastness and dyeability properties on such fibers. We have found our dyes to possess good fastness to light, gas, ozone, crocking, sublimation and washing and good build-up. This desirable combination of color, fastness properties and dyeability properties distinguishes our novel compounds from those described in the prior art.

The coupler radicals represented by A are well known in the art of disperse azo dyes as evidenced by the great number of U.S. and foreign patents disclosing such radicals. These known coupling components are attached to the azo group by a carbon atom which is a ring member of the benzene moiety of the coupler and which is in a para-position relative to the nitrogen atom of the coupler nucleus.

Typical of the couplers represented by A are those conforming to the formulas

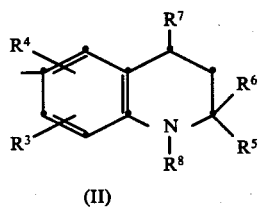 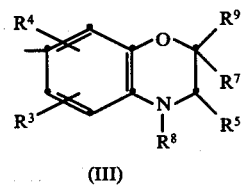

(II) (III)

in which $R^3$ through $R^9$ represent hydrogen or a wide variety of substituents. Examples of the substituents represented by $R^3$ and $R^4$ include halogen and unsubstituted and substituted alkyl, alkoxy, alkylthio, arylthio and acylamido radicals. Such acylamido groups include those having the formula —NH—X—$R^{10}$ in which X is —CO—, —COO—, or —$SO_2$ and $R^{10}$ is hydrogen, unsubstituted or substituted alkyl, cycloalkyl, or aryl or when X is —CO—, or —$SO_2$—, $R^{10}$ also can be amino, alkylamino, dialkylamino, arylamino, or furyl. The alkyl groups represented by $R^{10}$ preferably are hydrogen, unsubstituted lower alkyl or lower alkyl substituted, for example, with halogen, aryl, cyano, lower alkylsulfonyl, hydroxy, lower alkylthio, lower alkanoyloxy, etc. As used herein to describe a substituent containing an alkyl moiety, "lower" designates a carbon content of one to about four carbon atoms. Cyclohexyl and lower alkylcyclohexyl are representative cycloalkyl groups represented by $R^{10}$. Methylamino, ethylamino, and butylamino are typical alkylamino groups which $R^{10}$ can represent. Typical aryl groups represented by $R^{10}$ and the aryl component of the arylamino groups represented by $R^{10}$ are described hereinbelow. Acetyl, propionyl, butyryl, cyanoacetyl, chloroacetyl, bromoacetyl, trifluoroacetyl, phenylacetyl, methoxyacetyl, ethylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, 2-chloroethylsulfonyl, cyclohexoyl, 4-ethylcyclohexoyl, benzoyl, 4-ethylbenzoyl, 4-cyanobenzoyl, 4-ethoxycarbonylbenzoyl, phenoxycarbonyl, 2,4-dichlorophenoxycarbonyl, 4-bromophenoxycarbonyl, 4-acetamidophenoxycarbonyl, benzenesulfonyl, p-toluenesulfonyl, 4-propionamidophenylsulfonyl, 4-chlorophenylsulfonyl, cyclohexoxycarbonyl, 4-butylcyclohexylsulfonyl, ethylcarbamoyl, butysulfamoyl, phenylcarbamoyl, p-tolylcarbamoyl, p-anisylcarbamoyl, and phenylsulfamoyl are typical groups represented by —X—$R^{10}$.

The alkyl and alkoxy groups which can be present on the carbon atoms of the coupler nucleus preferably are unsubstituted lower alkyl and lower alkoxy such as methyl, ethyl, methoxy, ethoxy and butoxy. Phenoxy, p-tolyloxy, p-ethoxyphenoxy, methylthio, ethylthio, butylthio, phenylthio, m-acetamidophenylthio, and p-chlorophenylthio are typical aryloxy, alkylthio and arylthio groups which can be present on the coupler ring. $R^5$ preferably is hydrogen or methyl or, when $R^6$ and $R^7$ each is hydrogen, $R^5$ also can be lower alkyl, and $R^6$ and $R^7$ each is hydrogen or methyl.

$R^8$ can represent unsubstituted or substituted alkyl of up to about eight or more carbon atoms or cycloalkyl such as the cycloalkyl groups represented by $R^{10}$. The substituents which can be present on alkyl radical $R^8$ are limited primarily only by economic considerations and include hydroxy, lower alkoxy, halogen, cyano, succinimido, glutarimido, 1,2,4-triazolylthio, phthalimido, cyclohexyl, aryl, and groups having the formula —NH—X—$R^{10}$, —X—$R^{10}$, —OCO—$R^{10}$, and —OCOO—$R^{10}$. Couplers containing such substituents are well known in the art and/or can be prepared by known means. Preferably, the substituted alkyl radicals represented by $R^8$ are substituted lower alkyl.

Preferred couplers represented by A are those of formulas (II) and (III) in which $R^3$ is hydrogen, lower alkyl, lower alkoxy, chlorine, bromine, lower alkoxycarbonylamino or lower alkoxyamino;

$R^4$ is hydrogen, lower alkyl, lower alkoxy, chlorine or bromine;

$R^5$ is hydrogen, lower alkyl or, when $R^6$ and $R^7$ each is methyl, $R^5$ is methyl;

$R^6$, $R^7$ and $R^9$ each is hydrogen or methyl; and $R^8$ is lower alkyl or lower alkyl substituted with hydroxy, formamido, sulfonamido, lower alkylsulfonamido, lower dialkylsulfonamido, hydroxy substituted lower alkanoylamino, lower alkoxy, cyano, carbamoyl, lower alkylcarbamoyl, lower dialkylcarbamoyl, lower alkanoylamino, lower alkoxycarbonylamino, lower alkanoyloxy, or lower alkoxycarbonyl.

A group of our novel compounds which, because of their cost:performance ratio, are especially valuable dyes for synthetic polyamide fibers have the formula

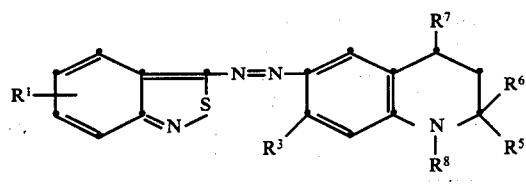

and

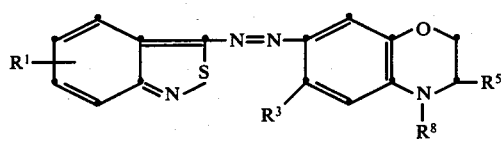

wherein $R^1$ is hydrogen or a chlorine or bromine atom positioned at the 5 or 6 position;

$R^3$ is methyl, lower alkoxycarbonylamino, lower alkanoylamino or lower alkanoylamino substituted with hydroxy, lower alkoxy or halogen;

$R^5$ is hydrogen, lower alkyl or, when $R^6$ and $R^7$ are methyl, $R^5$ is methyl;

$R^6$ and $R^7$ each is hydrogen or methyl; and $R^8$ is lower alkyl, lower alkyl substituted with formamido, sulfonamido, lower alkylsulfonamido, lower dialkylsulfonamido, hydroxy substituted lower alkanoylamino, hydroxyethyl, hydroxypropyl, lower alkoxyethyl, lower alkoxypropyl, carbamoylethyl, lower alkylcarbamoylethyl, lower alkanoylaminoethyl, lower alkanoylaminopropyl, lower alkoxycarbonylaminoethyl, lower alkoxycarbonylaminopropyl, lower alkylsulfonamidoethyl or lower alkylsulfonamidopropyl.

The azo compounds of the invention are prepared by diazotizing known 3-amino-2,1-benzisothiazoles and coupling the resulting diazonium salt with a tetrahydroquinoline or benzomorpholine disperse dye coupler according to conventional procedures. The couplers are known compounds and/or can be obtained by published procedures or techniques analogous thereto. The novel azo compounds, their use and their preparation are further illustrated by the following examples.

EXAMPLE 1

To 5 ml. of concd. $H_2SO_4$ is added 0.72 g. of $NaNO_2$ portionwise below 80° C. The solution is cooled and 10 ml. of 1:5 acid (1 part propionic: 5 parts acetic acid) is added below 20° C. The mixture is cooled further and 3-amino-2,1-benzisothiazole (1.5 g.) is added, followed by 10 ml. of 1:5 acid, all at 0°-5° C. The diazonium, after stirring at 0°-5° C. for 1 hr., is added to an ice cold solution of N-2-acetamidoethyl-2,7-dimethyl-1,2,3,4-tetrahydroquinoline (2.46 g.) in 15 ml. of 1:5 acid, below 10° C. The pH of the coupling mixture is adjusted to Congo Red with the addition of $NH_4OAc$ and coupling is allowed 45 min. at 10° C. The coupling mixture is drowned in water and the azo product is collected by filtration, washed with water and air-dried. The azo compound obtained imparts reddish-blue shades to nylon and exhibits good fastness properties.

EXAMPLE 2

3-Amino-5-chloro-2,1-benzisothiazole (1.84 g.) is dissolved in 25 ml. of 85% $H_3PO_4$. A portion (0.72 g.) of $NaNO_2$ is added portionwise below 0° C. to the $H_3PO_4$ solution. The diazonium, after stirring at 0° 1 C. for 2.0 hr., is added to an ice-cold solution of N-ethyl-2,2,4-trimethyl-7-acetamido-1,2,3-4-tetrahydroquinone (2.46 g.) in 15 ml. of 1:5 acid below 10° C. The pH of the coupling mixture is added to Congo Red with the addition of $NH_4OAc$ and coupling is allowed 1.0 hr. at 10° C. The coupling mixture is drowned in water and the product is collected by filtration, washed with water and air-dried. The azo dye obtained imparts blue shades to nylon.

EXAMPLE 3

A diazonium solution prepared as described in Example 2 is added to a chilled solution of N-ethyl-2,7-dimethylbenzomorpholine (1.91 g.) dissolved in 15 ml. of 1:5 acid. The coupling and isolation techniques described in Example 2 yield an azo compound which produces level, fast, blue shades on nylon fibers.

The compounds set forth in the examples of Tables I and II are prepared by the procedures described hereinabove and conform, respectively, to the formulas

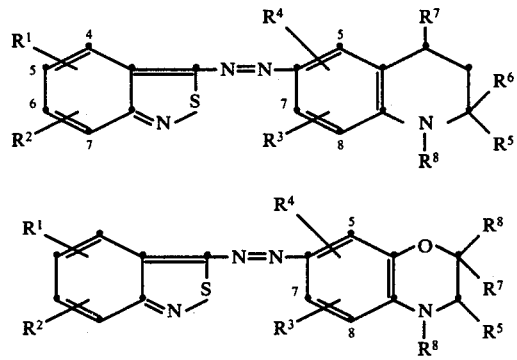

The color given for each of the compounds of Tables I and II refers to the shade it produces on nylon 66 fibers. Examples 1 and 2 of Table I and Example 60 of Table II designate the structures of the compounds obtained in the preceding examples.

Table 1

| Example No. | $R^1, R^2$ | $R^2, R^4, R^5, R^6, R^7$ | $R^8$ | Color |
|---|---|---|---|---|
| 1 | H | 2,7-di-$CH_3$ | —$C_2H_5$ | Reddish-blue |
| 2 | 5-Cl | 2,2,4-tri-$CH_3$-7-NHCOCH$_3$ | —$C_2H_5$ | Blue |
| 3 | H | 2-$CH_3$ | —$C_2H_5$ | Reddish-blue |
| 4 | H | 2,2,4-tri-$CH_3$ | —$CH_2CH_2CONH_2$ | Violet |
| 5 | H | 2-$CH_3$ | —$CH_2CH_2NHCOOC_2H_5$ | Violet |
| 6 | H | 2,7-di-$CH_3$ | —$C_2H_5$ | Reddish-blue |
| 7 | H | 2,7-di-$CH_3$ | —$CH_2CH_2OH$ | Reddish-blue |
| 8 | H | 2,7-di-$CH_3$ | —$CH_2CH(OH)CH_3$ | Reddish-blue |
| 9 | H | 2,7-di-$CH_3$ | —$CH_2CH(OH)CH_2OCH(CH_3)_2$ | Reddish-blue |
| 10 | H | 2,7-di-$CH_3$ | —$CH_2CH(OH)CH_2Cl$ | Reddish-blue |
| 11 | H | 2,2,4,7-tetra-$CH_3$ | —$(CH_2)_3NHCOCH_3$ | Reddish-blue |
| 12 | H | 2,2,4,7-tetra-$CH_3$ | —$CH_2C_6H_5$ | Reddish-blue |

Table 1-continued

| Example No. | $R^1, R^2$ | $R^2, R^4, R^5, R^6, R^7$ | $R^8$ | Color |
|---|---|---|---|---|
| 13 | H | 2,2,4,7-tetra-$CH_3$ | —$CH_2CH_2C_6H_5$ | Reddish-blue |
| 14 | H | 2,2,4,7-tetra-$CH_3$ | —$CH_2CH_2OC_6H_5$ | Reddish-blue |
| 15 | H | 2,2,4,7-tetra-$CH_3$ | —$CH_2CH_2OCH_3$ | Reddish-blue |
| 16 | H | 2,2,4,7-tetra-$CH_3$ | —$CH_2CH_2CONH_2$ | Reddish-blue |
| 17 | H | 2,2,4,7-tetra-$CH_3$ | —$CH_2CH_2OOCCH_3$ | Reddish-blue |
| 18 | H | 2,2,4,7-tetra-$CH_3$ | —$CH_2CH_2CN$ | Violet |
| 19 | H | 2,2,4,7-tetra-$CH_3$ | —$CH_2CH_2SO_2CH_3$ | Violet |
| 20 | H | 2,2,4,7-tetra-$CH_3$ | —$CH_2CH_2SO_2NHC_2H_5$ | Violet |
| 21 | H | 2,2,4,7-tetra-$CH_2$ | —$(CH_2)_3NCOCH_2CH_2CO$ (ring) | Reddish-blue |
| 22 | H | 2,2,4,7-tetra-$CH_3$ | —$CH_3CH_2NHSO_2CH_3$ | Reddish-blue |
| 23 | H | 2,2,4-tri-$CH_3$-7-$NHCOCH_3$ | —$CH_2CH_2OCH_3$ | Blue |
| 24 | H | 2,2,4-tri-$CH_3$-7-$NHCOCH_3$ | —$CH_2CH_2OH$ | Blue |
| 25 | H | 2,2,4-tri-$CH_3$-7-$NHCOCH_3$ | —$(CH_2)_3NHCOCH_3$ | Blue |
| 26 | H | 2,2,4-tri-$CH_3$-7-$NHCOCH_3$ | —$CH_2CH(CH_3)CH_3$ | Blue |
| 27 | H | 2,2,4-tri-$CH_3$-7-$NHCOCH_3$ | —$CH_2CH(CH_3)C_2H_5$ | Blue |
| 28 | H | 2,2,4-tri-$CH_3$-7-$NHCOCH_3$ | —$(CH_2)_3OH$ | Blue |
| 29 | H | 2,2,4-tri-$CH_3$-7-$NHCOCH_3$ | —$CH_2CH_2OOCOC_2H_5$ | Blue |
| 30 | H | 2,2,4-tri-$CH_3$-7-$NHCOCH_3$ | —$CH_2C_6H_{11}$ | Blue |
| 31 | H | 2,2,4-tri-$CH_3$-7-$NHCOCH_3$ | —$CH_2C_6H_5$ | Blue |
| 32 | H | 2,2,4-tri-$CH_3$-7-$NHCOOC_2H_5$ | —$C_2H_5$ | Blue |
| 33 | H | 2,2,4-tri-$CH_3$-7-$NHCOCH_2OH$ | —$C_2H_5$ | Blue |
| 34 | H | 2,2,4-tri-$CH_3$-7-$NHCOCH_2CH_2OH$ | —$CH_2CH_2SC=N—NH—CH=N$ (ring) | Blue |
| 35 | H | 2,2,4-tri-$CH_3$-7-$NHCOC_6H_{11}$ | —$CH_2CH_2SC=N—NH—CH=N$ (ring) | Blue |
| 36 | H | 2,2,4-tri-$CH_3$-7-$NHCOC_6H_3$ | —$C_2H_5$ | Blue |
| 37 | H | 2,2,4-tri-$CH_3$-7-$NHCOCH_2Cl$ | —$C_2H_5$ | Blue |
| 38 | H | 2,2,4-tri-$CH_3$-7-$NHCOCH_2OC_6H_5$ | —$C_2H_5$ | Blue |
| 39 | H | 2,2,4-tri-$CH_3$-7-$NHCOCH_2C_6H_5$ | —$C_2H_5$ | Blue |
| 40 | H | 2-$CH(CH_3)_2$-7-$NHCOCH_3$ | —$CH(C_2H_5)(CH_2)_4CH_3$ | Blue |
| 41 | H | 2-$CH(CH_3)_2$-7-$NHCOCH_3$ | —$CH_2CH_2OH$ | Blue |
| 42 | 5-Cl | 2-$CH(CH_3)_2$-7-$NHCOCH_3$ | —$CH_2CH_2OH$ | Blue |
| 43 | 5-Cl | 2-$CH(CH_3)_2$-7-$NHCOCH_3$ | —$CH_2CH_2OOCCH_3$ | Blue |
| 44 | 5-Cl | 2,2,4,7-tetra-$CH_3$ | —$CH_2CH_2OH$ | Blue |
| 45 | 5-Cl | 2,2,4,7-tetra-$CH_3$ | —$(CH_2)_3NHCOCH_3$ | Blue |
| 46 | 5-Cl | 2,2,4,7-tetra-$CH_3$ | —$CH_2CH_2NHCOCH_3$ | Blue |
| 47 | 5-Br | 2-$CH_3$-7-$NHCOCH_3$ | —$C_2H_5$ | Blue |
| 48 | 6-Cl | 2-$CH_3$-7-$NHCOCH_3$ | —$C_2H_5$ | Blue |
| 49 | 6-$CH_3$ | 2-$CH_3$-7-$NHCOCH_3$ | —$C_2H_5$ | Blue |
| 50 | 6-$OCH_3$ | 2-$CH_3$-7-$NHCOCH_3$ | —$CH_2CH_2CON(C_2H_5)$ | Blue |
| 51 | 5-$OCH_3$ | 2-$CH_3$-7-$NHCOCH_3$ | —$CH_2CH(CH_3)_2$ | Blue |
| 52 | 6-$OCH_3$ | 2-$CH_3$-7-$NHCOCH_3$ | —$C_2H_5$ | Blue |
| 53 | 5-Cl | 2,2,4-tri-$CH_3$-7-$OCH_3$ | —$CH_2CH_2OH$ | Blue |
| 54 | 5-Cl | 2,2,4-tri-$CH_3$-5,8-di-$OCH_3$ | —$CH_2CH_2OH$ | Blue |
| 55 | 5-Cl | 2,2,4,5,8-penta-$CH_3$ | —$CH_2CH_3OH$ | Blue |
| 56 | 5-Cl | 2,2,4-tri-$CH_3$-7-Cl | —$C_2H_5$ | Reddish-blue |
| 57 | 5-Cl | 2,2,4,5-tetra-$CH_3$-8-$OCH_3$ | —$C_2H_5$ | Blue |
| 58 | 5-Cl | 2,2,4,8-tetra-$CH_3$-5-$OCH_3$ | —$C_2H_5$ | Blue |
| 59 | 5,6-di-Cl | 2,7-di-$CH_3$ | —$CH_2CH_2CONH_2$ | Reddish-blue |

Table II

| Example No. | $R, R^2$ | $R^3, R^4, R^5, R^7, R^9$ | $R^8$ | Color |
|---|---|---|---|---|
| 60 | 5-Cl | 2,7-di-$CH_3$ | —$C_2H_5$ | Blue |
| 61 | H | 2,7-di-$CH_3$ | —$C_2H_5$ | Blue |
| 62 | H | 2,7-di-$CH_3$ | —$CH_2CH_2OH$ | Blue |
| 63 | H | 2,7-di-$CH_3$ | —$CH_2CH_2OOCCH_3$ | Blue |
| 64 | H | 2,7-di-$CH_3$ | —$CH_2CH_2Cl$ | Blue |
| 65 | H | 2,7-di-$CH_3$ | —$CH_2CH_2CN$ | Blue |
| 66 | H | 2,7-di-$CH_3$ | —$CH_2CH_2CONH_2$ | Blue |
| 67 | H | 2,3,7-tri-$CH_3$ | —$CH_2CH_2CONH_2$ | Blue |
| 68 | H | 2,3,3,7-tetra-$CH_3$ | —$CH_2CH_2CONH_2$ | Blue |
| 69 | H | 2,3,3,7-tetra-$CH_3$ | —$CH_2CH_2NHCOCH_3$ | Blue |
| 70 | H | 3,3,7-tri-$CH_3$ | —$CH_2CH_2NHCOCH_3$ | Blue |
| 71 | H | 3,7-di-$CH_3$ | —$CH_2CH_2NHCOCH_3$ | Blue |
| 72 | H | 3-$CH(CH_3)_2$-7-$CH_3$ | —$CH_2CH_2NHCOCH_3$ | Blue |
| 73 | H | 3-$C_2H_5$-7-$CH_3$ | —$CH_2CH_2NHCOCH_3$ | Blue |
| 74 | H | 2-$C_2H_5$-7-$CH_3$ | —$CH_2CH_2NHCOCH_3$ | Blue |
| 75 | H | 2-$C_6H_5$-7-$CH_3$ | —$CH_2CH_2NHCOCH_3$ | Blue |
| 76 | H | 2,7-di-$CH_3$ | —$CH_2CH_2NHCOCH_3$ | Blue |
| 77 | H | 2,7-di-$CH_3$ | —$CH_2CH_2NHSO_2CH_3$ | Blue |
| 78 | H | 2,7-di-$CH_3$ | —$(CH_2)_3NHCOCH_3$ | Blue |
| 79 | H | 2,3,7-tri-$CH_3$ | —$(CH_2)_3NHCOCH_3$ | Blue |
| 80 | H | 2,3,3,7-tetra-$CH_3$ | —$(CH_2)_3NHCOCH_3$ | Blue |
| 81 | H | 3,3,7-tri-$CH_3$ | —$(CH_2)_3NHCOCH_3$ | Blue |
| 82 | H | 3,7-di-$CH_3$ | —$(CH_2)_3NHCOCH_3$ | Blue |
| 83 | H | 2-$C_6H_5$-7-$CH_3$ | —$(CH_2)_3NHCOCH_3$ | Blue |
| 84 | H | 3-$C_2H_5$-3,7-di-$CH_3$ | —$(CH_2)_3NHSO_2CH_3$ | Blue |
| 85 | H | 2,7-di-$CH_3$ | —$CH_2CH_2OCH_3$ | Blue |
| 86 | H | 2,7-di-$CH_3$ | —$XCH_2CH(OH)CH_3$ | Blue |
| 87 | 5-Cl | 2,7-di-$CH_3$ | —$C_2H_5$ | Blue |
| 88 | 5-Cl | 2,7-di-$CH_3$ | —$CH_2CH_2NHCOCH_3$ | Blue |
| 89 | 5-Cl | 2-$CH_3$ | —$CH_2CH_2NHCOCH_3$ | Blue |
| 90 | 5-Cl | 2-$CH_3$-7-$NHCOCH_3$ | —$CH_2CH_2NHCOCH_3$ | Blue |

Table II-continued

| Example No. | R, R² | R³, R⁴, R⁵, R⁷, R⁹ | R⁸ | Color |
|---|---|---|---|---|
| 91 | 5-Cl | 2-CH₃-7-OCH₃ | —CH₂CH₂NHCOCH₃ | Blue |
| 92 | 5-Cl | 2-CH₃-7-OCH₃ | —(CH₂)₃NHCOCH₃ | Blue |
| 93 | 5-Cl | 2,7-di-CH₃ | —(CH₂)₃NHCOCH₃ | Blue |
| 94 | 5-Cl | 2-CH₃-7-NHCOCH₃ | —(CH₂)₃NHCOCH₃ | Blue |
| 95 | 5-Cl | 2-CH₃ | —(CH₂)₃NHCOCH₃ | Blue |
| 96 | 5-OCH₃ | 2,7-di-CH₃ | —(CH₂)₃NHCOCH₃ | Blue |
| 97 | 5-CH₃ | 2,7-di-CH₃ | —(CH₂)₃NHCOCH₃ | Blue |
| 98 | 5-CH₃ | 2-CH₃-7-NHCOCH₃ | —(CH₂)₃NHCOCH₂ | Blue |
| 99 | 5-OCH₃ | 2-CH₃-7-NHCOCH₃ | —CH₂CH₂NHCOOC₂H₅ | Blue |
| 100 | 6-OCH₃ | 2-CH₃-7-NHCOCH₃ | —CH₂CH₂NHCOOC₂H₅ | Blue |
| 101 | 6-Cl | 2-CH₃-7-NHCOCH₃ | —CH₂CH₂CONH₂ | Blue |
| 102 | 6-CH₃ | 2-CH₃-7-NHCOCH₃ | —CH₂CH₂CONH₂ | Blue |
| 103 | H | 2-CH₃-7-NHCOCH₃ | —(CH₂)₃NHCOCH₃ | Blue |
| 104 | H | 2-CH₃-7-NHCOCH₃ | —CH₂CH₂NHCOCH₃ | Blue |
| 105 | H | 2-CH₃-7-NHCOCH₃ | —CH₂CH₂CONH₃ | Blue |
| 106 | H | 2-CH₃-7-OCH₃ | —CH₂CH₂CONH₂ | Blue |
| 107 | H | 2-CH₃-7-OCH₃ | —CH₂CH₂NHCOCH₃ | Blue |
| 108 | H | 2-CH₃-7-OCH₃ | —(CH₂)₃NHCOCH₃ | Blue |
| 109 | H | 2-CH₃ | —(CH₂)₃NHCOCH₃ | Blue |
| 110 | H | 2-CH₃ | —CH₂CH₂NHCOCH₃ | Blue |
| 111 | H | 2-CH₃ | —(CH₂)₃NHCOCH₃ | Blue |
| 112 | 5-OCH₃ | 2-CH₃ | —(CH₂)₃NHCOCH₃ | Blue |
| 113 | 5-CH₃ | 2-CH₃ | —(CH₂)₃NHCOCH₃ | Blue |
| 114 | 6-Cl | 2-CH₃ | —(CH₂)₃NHCOCH₃ | Blue |
| 115 | 6-OCH₃ | 2-CH₃ | —(CH₂)₃NHCOCH₃ | Blue |
| 116 | 6-CH₃ | 2-CH₃ | —(CH₂)₃NHCOCH₃ | Blue |

The novel azo compounds can be applied to synthetic polyamide, polyester and cellulose acetate fibers according to known disperse dyeing techiques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 117

The azo compound (16.7 mg.) of Example 2 is dispersed in 10 cc. of 2-methoxyethanol. A smal amount (3-5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. The fabric is dyed a bright shade of blue exhibiting excellent fastness properties when tested in accordance with the procedures described in the *Technical Manual of the American Association of Textile Chemists and Colorists*, 1968 edition.

Dyes of great interest shown in Table III below have the formula;

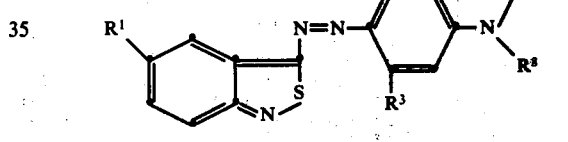

wherein
R¹ is hydrogen, chlorine, or bromine;
R³ is CH₃, NHCOCH₃, NHCOH;
R⁵ is hydrogen or —CH₃; and
R⁸ is —(CH₂) NHCOH where n = 2 or 3.

These dyes have particularly good light fastness, migration, buildup, crock resistance and ozone fastness on nylon fibers, particularly carpets.

TABLE III

| Example No. | R¹ | R³ | R⁵ | R⁸ | Color on Nylon |
|---|---|---|---|---|---|
| 118 | H | CH₃OCNH | H | C₂H₅ | Blue |
| 119 | H | CH₃OCNH | H | C₂H₄CONH₂ | Blue |
| 120 | Cl | CH₃OCNH | H | C₂H₄CONH₂ | Blue |
| 121 | Cl | CH₃OCNH | H | C₃H₆NHCOH | Blue |
| 122 | H | CH₃OCNH | H | C₂H₅NHCOH | Blue |
| 123 | Cl | CH₃OCNH | H | C₂H₅NHCOH | Blue |
| 124 | H | CH₃OCNH | CH₃ | C₃H₆NHCOH | Blue |
| 125 | Cl | CH₃OCNH | CH₃ | C₃H₆NHCOH | Blue |
| 126 | H | CH₃OCNH | CH₃ | C₂H₅NHCOH | Blue |
| 127 | Cl | CH₃OCNH | CH₃ | C₂H₅NHCOH | Blue |
| 128 | H | HOCNH | H | C₃H₆NHCOH | Blue |
| 129 | H | CH₃OCNH | H | C₃H₆NHCOCH₃ | Blue |
| 130 | Cl | CH₃OCNH | H | C₃H₆NHCOCH₃ | Blue |
| 131 | H | CH₃CONH | H | C₂H₄CN | Violet |
| 132 | Cl | CH₃CONH | H | C₂H₄CN | Blue |
| 133 | H | CH₃CONH | H | C₂H₄OH | Blue |
| 134 | Cl | CH₃CONH | H | C₂H₄OH | Blue |
| 135 | H | CH₃CONH | H | C₂H₄SO₂NH₂ | Violet |
| 136 | Cl | CH₃CONH | H | C₂H₄SO₂NH₂ | Blue |
| 137 | H | CH₃CONH | H | C₃H₆SO₂CH₃ | Blue |
| 138 | H | CH₃CONH | CH₃ | C₂H₅ | Blue |
| 139 | Cl | CH₃CONH | CH₃ | C₂H₅ | Blue |
| 140 | H | CH₃CONH | H | C₃H₆NHCOCH₂OH | Blue |
| 141 | Cl | CH₃CONH | H | C₃H₆NHCOCH₂OH | Blue |
| 142 | H | (CH₃)₂CHCONH | H | C₃H₆NHCOCH(CH₃)₂ | Blue |

TABLE III-continued

| Example No. | R¹ | R³ | R⁵ | R⁸ | Color on Nylon |
|---|---|---|---|---|---|
| 143 | H | CH₃ | CH₃ | C₃H₆NHCOH | Violet |
| 144 | Cl | CH₃ | CH₃ | C₃H₆NHCOH | Violet |
| 145 | H | CH₃ | CH₃ | C₂H₅NHCOH | Violet |
| 146 | Cl | CH₃ | CH₃ | C₂H₅NHCOH | Violet |
| 147 | H | CH₃CONH | H | C₃H₇NHCOH | Blue |
| 148 | H | CH₃CONH | H | C₂H₅ | Blue |

The synthetic polyamide fibers which can be dyed with the novel azo compounds are well known and have a basis of a linear polyamide such as nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright, fast shades by the compounds of the invention is set forth in U.S. Pat. No. 3,100,134. Although our novel compounds are particularly valuable dyes for polyamide fibers, they also can be used to dye cellulose acetate and polyester fibers fast reddish-blue to blue shades. Our compounds can be converted to the corresponding cationic azo compounds by treating the former with an alkylating agent such as dimethyl sulfate which results in alkylation of the benzisothiazolyl nitrogen atom. Such cationic compounds are useful for dyeing acrylic, modacrylic and sulfonate-modified polyester and polyamide fibers.

Although the invention has been described in considerable detail with particular reference to certain preferred embodiments thereof, variations and modifications can be effected within the spirit and scope of the invention.

We claim:

1. A compound having the formula

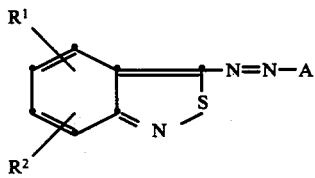

wherein R¹ and R² each is hydrogen, lower alkyl, lower alkoxy, chloro or bromo and A is

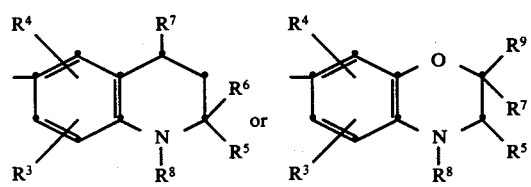

wherein
R³ is hydrogen, lower alkyl, lower alkoxy, chlorine, bromine, lower alkanoylamino, or lower alkoxycarbonylamino;
R⁴ is hydrogen;
R⁵ is hydrogen, lower alkyl or when R³, R⁶ and R⁷ each is methyl, R⁵ methyl;
R⁶, R⁷ and R⁹ each is hydrogen or R⁶ and R⁷ each is methyl; and
R⁸ is lower alkyl or lower alkyl substituted with hydroxy, sulfonamido, lower alkylsulfonamido, lower dialkylsulfonamido, lower alkoxy, cyano, carbamoyl, lower alkylcarbamoyl, lower dialkylcarbamoyl, acetamido, hydroxy substituted lower alkanoylamino, lower alkanoyloxy, or lower alkoxycarbonyl.

2. A compound having the formula

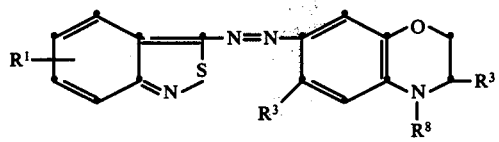

wherein
R¹ is hydrogen, chloro or bromo positioned at the 5 or 6 position;
R³ is methyl, lower alkoxycarbonylamino or lower alkanoylamino;
R⁵ is hydrogen or lower alkyl; and
R⁸ is lower alkyl substituted with sulfonamido, lower alkylsulfonamido, lower dialkylsulfonamido, hydroxy substituted lower alkanoylamino; lower alkyl; hydroxyethyl; hydroxypropyl; lower alkoxyethyl; lower alkoxypropyl; carbamoylethyl; lower alkylcarbamoylethyl; lower alkanoylaminoethyl; lower alkanoylaminopropyl; lower alkoxycarbonlaminoethyl; lower alkoxycarbonylaminopropyl; lower alkylsulfonamidoethyl or lower alkylsulfonamidopropyl.

3. A compound according to claim 1 having the formula

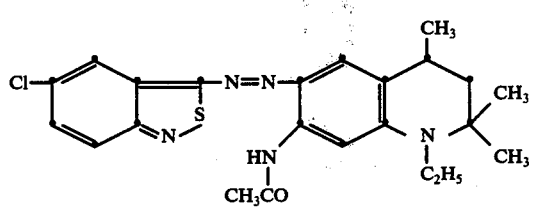

4. A compound according to claim 1 having the formula

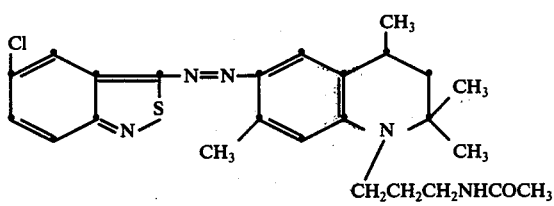

5. A compound according to claim 1 having the formula

6. A compound according to claim 1 having the formula
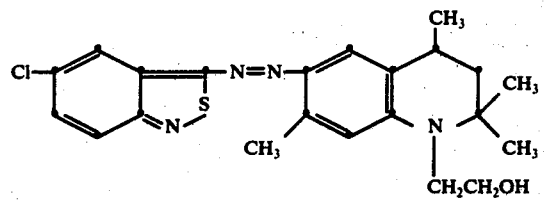
7. A compound according to claim 1 having the formula
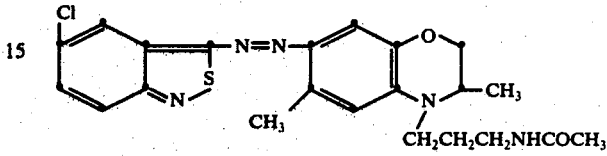
* * * * *

UNITED STATES PATENT OFFICE
CERTIFICATE OF CORRECTION

Patent No. 4,070,352      Dated January 24, 1978

Inventor(s) Ronald J. Maner and Max A. Weaver

It is certified that error appears in the above-identified patent and that said Letters Patent are hereby corrected as shown below:

The title should read ---Dyes From Benzisothiazole Diazo Compounds and Certain Tetrahydroquinoline or Benzomorpholine Type Couplers---

Column 4, line 19, following "is" the word "added" should read ---adjusted---.

Columns 3-4, Table 1, in the heading, "$R^2, R^4, R^5, R^6, R^7$" should read ---$R^3, R^4, R^5, R^6, R^7$---.

Columns 5-6, Table 1, in the heading, "$R^2, R^4, R^5, R^6, R^7$" should read ---$R^3, R^4, R^5, R^6, R^7$---.

Columns 5-6, Table 1, in the heading, the word "Color" should be the heading of the last column.

Columns 5-6, Table 1, under the column "$R^8$", Example No. 22, "$CH_3CH_2NHSO_2CH_3$" should read ---$CH_2CH_2NHSO_2CH_3$---.

Columns 5-6, Table II, under the column "$R^3, R^4, R^5, R^7, R^9$" at Example No. 74, "2-$C_2H_5$-7-$CH_5$" should read ---2-$C_2H_5$-7-$CH_3$---.

Columns 5-6, Table II, under the column "$R^8$", at Example No. 86, "-$XCH_2CH(OH)CH_3$" should read ---$CH_2CH(OH)CH_3$---.

UNITED STATES PATENT OFFICE
CERTIFICATE OF CORRECTION

Patent No. 4,070,352      Dated January 24, 1978

Inventor(s) Ronald J. Maner and Max A. Weaver

It is certified that error appears in the above-identified patent and that said Letters Patent are hereby corrected as shown below:

Columns 7-8, Table II, under the column "$R^8$", at Example No. 105, "-$CH_2CH_2CONH_3$" should read --- -$CH_2CH_2CONH_2$---.

Column 7, line 38, "smal" should read ---small---.

Signed and Sealed this

Twenty-sixth Day of September 1978

[SEAL]

Attest:

RUTH C. MASON
*Attesting Officer*

DONALD W. BANNER
*Commissioner of Patents and Trademarks*